Dec. 13, 1966  A. M. SMITH  3,291,520
STATION WAGON UTILITY COMPARTMENT AND REMOVABLE COVER THEREFOR
Filed June 10, 1964
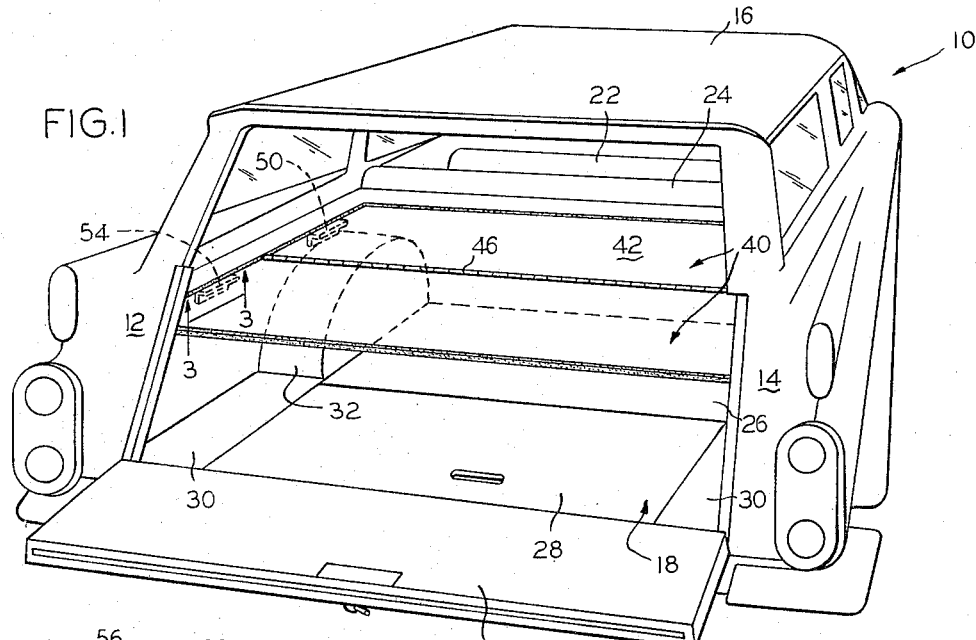
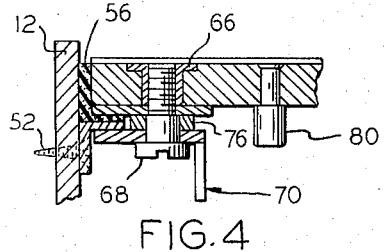
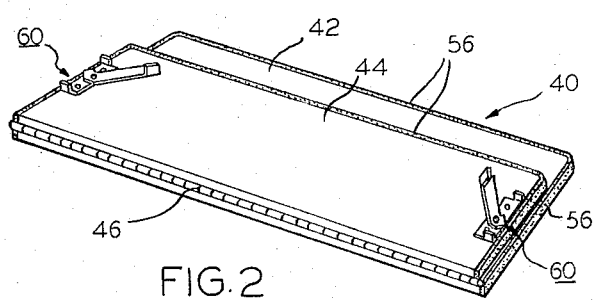
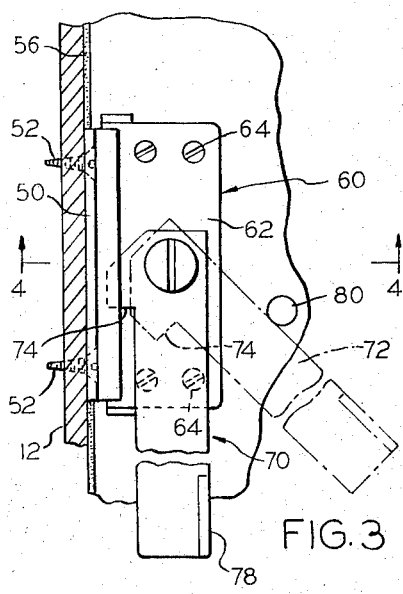
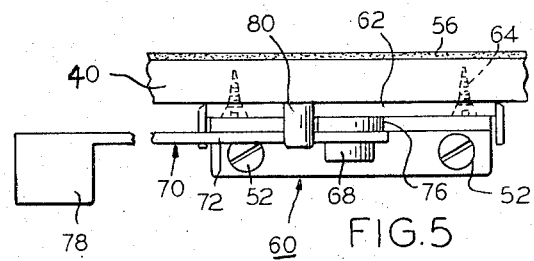
INVENTOR.
ALVA MERL SMITH
BY
ATTORNEY

United States Patent Office 3,291,520
Patented Dec. 13, 1966

3,291,520
STATION WAGON UTILITY COMPARTMENT AND
REMOVABLE COVER THEREFOR
Alva Merl Smith, 1758 Winnemac Ave., Chicago, Ill.
Filed June 10, 1964, Ser. No. 373,920
2 Claims. (Cl. 296—24)

The present invention relates to automotive station wagons and has particular reference to a novel utility compartment for such vehicles, the compartment being provided with a removable cover which, when in position over the compartment, permits limited access to the compartment without necessitating removal of the cover, and when removed, full access to the compartment is made possible. The invention is applicable, substantially without modification, to station wagons of the nine passenger variety having two seats behind the driver's seat, or to station wagons of the seven passenger variety having only one such rear seat.

The utility aspect of the automotive station wagons is predicated upon the fact that the rear seats and their respective back rests are foldable into the common floor plane of the vehicle body or are otherwise removable from their normal erected positions so that the floor area normally occupied by such seats and back rests presents an unbroken floor area or deck for storage purposes. When used for storage purposes in this manner, the storage articles are visible through the window openings of the vehicle, thus inviting theft. Additionally, articles which are openly stored on the deck of a station wagon are exposed to the elements in inclement weather in the event that one or more of the windows of the vehicle are inadvertently left open. To overcome these difficulties, tarpaulins are sometimes employed by tourists to conceal and protect their luggage and other items but the use of tarpaulins and other flexible covers presents numerous difficulties, principal among which is the difficulty encountered in fitting the covers to the articles to be concealed and the lack of anchor points for the covers so that they will not become wind-blown. Furthermore, if at any time access to an individual article is required, the entire tarpaulin or other cover frequently must be removed before the article can be located.

The present invention is designed to overcome the above-noted limitations, and toward this end the invention contemplates the provision of a novel compartment-forming panel assembly, together with novel means whereby the same may be applied to or installed in the interior space of a station wagon body, and which, when operatively installed therein, affords a protected and concealed luggage compartment, the deck of the station wagon body affording a bottom wall for the compartment and the panel assembly serving as a top wall for the compartment.

Another object is to provide a compartment-forming panel assembly of this character which, when employed in connection with full station wagon deck area, may be slid longitudinally to selected positions over the deck area and locked in such selected positions, thereby making it possible to effect desired luggage placement on the deck and concealment of the luggage so placed.

Yet another object is to provide a compartment-forming panel assembly which is comprised of hinged sections, and which when installed in a station wagon will yield selected access to either the front region or the rear region of the compartment, each to the exclusion of the other, such access being had by the simple expedient of unlocking and raising the desired panel section to expose the articles stored directly therebeneath.

An additional object is to provide a panel assembly requiring for its installation no modification or alteration of the basic seating arrangement of the station wagon, or of the seats or back rests associated therewith.

It is still a further object to provide a two-part hinged panel assembly of the character briefly outlined above which is capable of removal manually from its installed position without the use of tools and which, when so removed, is capable of being collapsed or folded to a flat condition so that it may conveniently be stored either on the deck of the vehicle when the seats are folded or in the limited rear storage space which ordinarily is provided immediately behind the rearmost seat back rest when all the seats are erected.

Finally, it is an object of the invention to provide such a compartment-forming panel assembly which is capable of being manufactured as original equipment on new station wagons or which is readily applicable to existing used vehicles without requiring extensive alterations to the interior of the passenger compartment.

The provision of a compartment-forming panel assembly which is extremely simple in its construction, and which therefore may be manufactured at a low cost; one which is rugged and durable and which therefore will withstand rough usage; one which is comprised of a minimum number of parts; one which may be operated or otherwise handled with comparative ease; one which is attractive in its appearance and pleasing in its design; and one which, otherwise, is well adapted to perform the services required of it, are further desirable features which have been borne in mind in the production and development of the present invention.

Other objects and advantages of the invention, not at this time enumerated, will readily suggest themselves as the nature of the invention is better understood.

In the accompanying single sheet of drawings forming a part of this specification, one illustrative embodiment of the invention has been shown.

In the drawing:

FIG. 1 is a perspective view of a station wagon showing the improved compartment-forming panel assembly of the present invention operatively installed therein;

FIG. 2 is a perspective view of the panel assembly, showing the same in a folded or collapsed condition;

FIG. 3 is an enlarged fragmentary view looking substantially along the horizontal plane indicated by the line 3—3 of FIG. 1 and in the direction of the arrows;

FIG. 4 is a sectional view taken substantially along the line 4—4 of FIG. 3; and FIG. 5 is a side elevational view of the structure shown in FIG. 4.

Referring now to the drawing in detail and in particular to FIG. 1, a conventional nine passenger station wagon body has been designated in its entirety at 10, and it is shown as having the usual passenger enclosure which is defined in part by the vehicle body sides or walls 12 and 14, roof 16, and floor deck 18. The vehicle tail gate 20 is shown as being in its horizontal open position. The station wagon body 10, being a nine passenger body, makes provision for three passenger seats, the back rest for the front seat being shown at 22 and the back rest for the intermediate seat being shown at 24. The deck 18 is established in the usual manner by reason of the collapsing or folding of the back rest 26 of the rear seat into the horizontal plane of the usual sectional hinged tire compartment lid 28 and of the stationary deck side plates 30. Wheel wells 32 project upwardly through the side plates 30 in the usual manner of station wagon body construction.

The arrangement of parts thus far described is purely conventional and no claim is made herein to any novelty per se associated with the same, the novelty of the present invention residing rather in the construction of the compartment-forming panel assembly and its association in combination with the vehicle body 10 as will now be described in detail.

Referring now to FIG. 2, the compartment-forming panel assembly of the present invention has been designated in its entirety at 40 and it is comprised of two panel sections including a front section 42 and a rear section 44. The panels 42 and 44 are hinged together along a pair of meeting edges by a conventional piano hinge 46 which is substantially coextensive with these edges. The sections 42 and 44 are movable between one extreme position wherein they are coplanar as shown in FIG. 1, and another extreme position wherein they are folded flat against each other as shown in FIG. 2.

The front panel 42 is adapted to be supported upon a pair of angle pieces 50 which are secured by screws 52 (FIG. 3) to the opposite vehicle body sides 12 and 14 and which establish horizontal ledge portions for sliding support of the panel 42. The rear panel 44 similarly is adapted to be slidingly supported upon a pair of angle pieces 54 identical to the angle pieces 50 and similarly secured to the sides 12 and 14. When the two panel sections 42 and 44 are in position on their respective angle pieces 50 and 54, rubber or other elastomeric strips 56 which line the exposed side edges of the panels bear against the sides 12 and 14 of the body 10 and cushion the panel section against rattling.

The two pairs of opposed angle pieces 50 and 54 are disposed at the same horizontal level and each angle piece is of appreciable longitudinal extent so that the panel sections 42 and 44 may assume different longitulinal positions within the vehicle passenger compartment for purposes that will be set forth presently. In the normal position of the panel sections 42 and 44, the front edge of the panel section 42 will bear against the rear side of the back rest 24 adjacent the top thereof while the rear edge of the panel section 44 will lie in close proximity to the tail gate 20 when the latter is in its closed position, the panel assembly thus establishing a concealed compartment therebeneath and the height of which is slightly less than the overall height of the back rest 24.

In order to effectively secure the panel sections 42 and 44 in position on the angle pieces 50 and 54 respectively, each panel section is provided with a pair of latch assemblies 60 on its underneath side and adjacent the side edges thereof. The four latch assemblies 60 are identical in their construction and therefore a description of one of them will suffice for them all.

Each latch assembly 60 comprises a mounting plate 62 (FIG. 3) of generally rectangular design, the plate being secured to the underneath face of its respective panel section by fastening screws 64 or the like. A threaded ferrule 66 embedded in the panel section 42 or 44, as the case may be, receives a shouldered stud 68 on which there is mounted for swinging movement an L-shaped latch member 70 having a long lever arm 72 and a relatively short latch finger 74. A spacer washer 76 is interposed between the latch member 70 and mounting plate 62. The lever arm 72 is formed with a laterally turned manipulating finger or tab 78.

The latch member 70 is movable between the unlatched position shown in FIG. 3 in dotted lines, and wherein the latch finger 74 lies wholly within the rectangular confines of the panel assembly, and the extended operative latching position wherein it is shown in full lines with the latch finger overhanging the adjacent edge of the associated panel section and underlying the horizontal ledge portion of the adjacent angle piece 50 or 54 as the case may be. In the latched position, the mounting plate 62 overlies the adjacent angle piece while the latch finger 74 underlies the angle piece with the horizontally extending ledge portion of the latter being securely clamped between these two parts so that the associated panel section is held against either upward movement or longitudinal shifting movement along the angle piece. In other words, with the four latch assemblies 60 in their latched condition, the panel assembly is fixedly and securely held in position on the angle pieces 50 and 54 against shifting movement in any direction and the panel assembly is thus locked in position. A limit stop pin 80 on the underneath side of the associated panel section serves to define the unlatched position of the latch member 70.

In the operation of the herein described compartment-forming panel assembly 40, when the assembly is not in use the panel section 44 may be folded upon the panel section 42 in the manner shown in FIG. 2 and the folded assembly stored conveniently within the passenger compartment of the station wagon body 10, whether the various seats be erected or knocked down. It is to be noted that in its folded condition, the two pairs of latch assemblies 60 are disposed on opposite sides of the assembly so that there is no obstruction to prevent coextensive face-to-face folding of the panel sections upon each other. To install the assembly in the passenger compartment, the folded assembly may be caused to rest upon the two opposed angle pieces 50 and, because the panel seciton 44 is in an out-of-the-way position, the latch assemblies 60 associated with the panel section 42 are readily accessible beneath the panel section for manipulation by the simple expedient of reaching under the panel section 42. The assembly may be slid forwardly until the front edge of the section 42 abuts against the rear side of the seat back rest 24, after which the two latch assemblies associated with the panel section 42 may be manipulated in the manner previously described to cause the latch fingers 74 to underlie the horizontal ledge portions of the respective angle pieces 50. This locks the folded assembly 40 in position over the forward region of the deck 30, and thereafter such articles of luggage as may be found desirable may be packed or stored beneath the panel section 42.

After thus loading the forward region of the deck 30, the panel section 44 may be swung through an angle of 180° to bring the same into the general plane of the panel section 42, it being assumed, of course, that the tail gate 20 has previously been moved to its open position. The panel 44 will then come to rest upon the angle pieces 54, after which the two latch assemblies 60 associated with this latter panel may be manipulated to lock the panel in position on the angle pieces 54. The rear portion of the deck 30 may then be loaded with such remaining articles of luggage as are considered appropriate, after which the tail gate 20 may be swung to its closed position.

Obviously, the above described loading procedure may be varied to accommodate the preferences of the operator. For example, the rear deck area may be loaded prior to movement of the panel section 44 from its folded position on the panel section 42 to its unfolded position. Additionally, the entire deck area may be loaded prior to installation of the panel assembly 10 if desired. In such an instance, latching of the two forward latch assemblies 60 may be effected from in front of the panel assembly by inclining the back rest 24 to render access to the latch assemblies.

With the panel assembly 40 in its operative installed position as shown in FIG. 1, access to either the forward or the rear region of the storage compartment may be had without completely removing the panel assembly from its installed position. To obtain access to the rear region of the compartment, it is merely necessary to lower the tail gate 20 and articles which are stored near the extreme rear end of the deck 30 will immediately be available. If desired, the latch assemblies 60 associated with the rear panel section 44 may be released by reaching beneath the panel section and thereafter the panel section may be swung to its folded position over the panel 42 as shown in FIG. 2 to expose additional articles in the rear region of the compartment.

To obtain access to the front region of the compartment, the back rest 24 may be swung forwardly and the latch assemblies 60 associated with the front panel section 42 may be released and the panel section swung to a folded position over the panel section 44.

The invention is not to be limited to the exact arrangement of parts shown in the accompanying drawing or described in this specification as various changes in the details of construction may be resorted to without departing from the spirit of the invention. Therefore, only insofar as the invention has particularly been pointed out in the accompanying claims is the same to be limited.

I claim:

1. In an automotive vehicle of the type having a body defining a passenger compartment within which there is disposed a forward and a rearward seat and back assembly respectively, and a tail gate for closing said compartment, said rearward assembly being collapsible and, when collapsed, establishing a storage deck from which there extend upwardly on opposite sides thereof a pair of side walls: the improvement therein which comprises opposed ledge-forming members fixedly secured to said side walls at a level spaced upwardly above said storage deck and effective throughout a major portion of the longitudinal extent of the passenger compartment above said storage deck, a two-part foldable compartment-forming panel assembly adapted to be removably supported upon said ledge forming members and defining with said deck, side walls and forward seat and back rest assembly, a concealed storage compartment, said two-part panel assembly including forward and rearward flat panel sections hingedly connected together along a pair of meeting edges and foldable upon each other in face-to-face relationship whereby said sections may assume coplanar positions with each section being supported directly upon said ledge-forming members and with the other section overlying the same in superimposed relationship, and latch means supported on the lower side of said flat panel sections when the said sections are in such coplanar relationship and adapted to be in releasable engagement with said ledge-forming members, each of said latch means being comprised of a lever arm pivotally mounted on its flat panel section and pivoted selectively to a locking position with said ledge forming member and to an unlocked position therewith whereby said latching means may be locked and concealed from view when said tail gate is in position closing said compartment, and whereby the rearward flat panel section may be unlocked from said ledge forming member and folded upon the forward flat panel section to reveal readily the contents stored on said storage deck.

2. The invention according to claim 1 in which said ledge-forming members are secured to said side walls at approximately the uppermost level of the back rest portion of the forward seat and back rest assembly.

References Cited by the Examiner

UNITED STATES PATENTS

| 1,415,209 | 5/1922 | Troke | 296—63 |
| 2,767,896 | 10/1956 | Beck | 296—37 X |
| 2,820,687 | 1/1958 | Waring | 296—37 X |
| 2,889,097 | 6/1959 | Broehl | 296—37 X |
| 3,181,911 | 5/1965 | Peras | 296—37 |
| 3,195,745 | 7/1965 | Cretsinger | 296—37 X |

BENJAMIN HERSH, *Primary Examiner.*

P. GOODMAN, *Assistant Examiner.*